Oct. 8, 1935.                A. LUBALL                   2,016,644
              IDENTIFICATION DEVICE FOR TOOTHBRUSHES
                   Filed May 22, 1934        2 Sheets-Sheet 1

Inventor
ABRAHAM LUBALL

Oct. 8, 1935. A. LUBALL 2,016,644
IDENTIFICATION DEVICE FOR TOOTHBRUSHES
Filed May 22, 1934 2 Sheets-Sheet 2
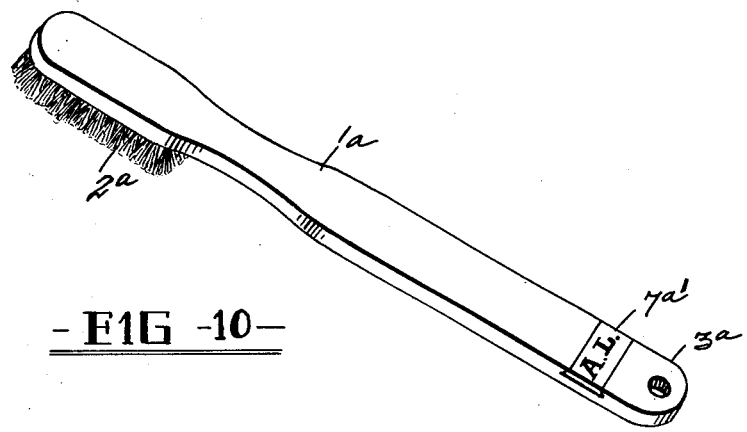
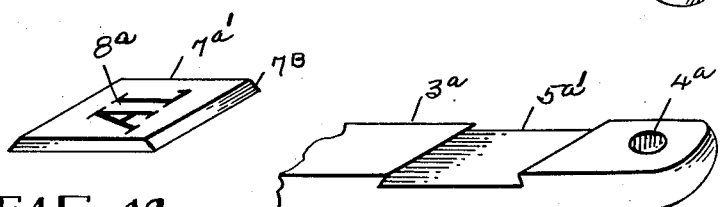
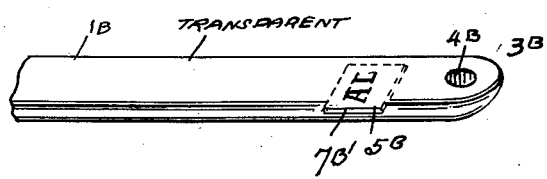
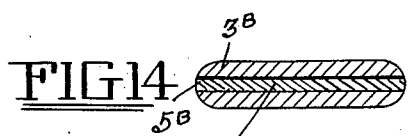 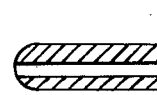
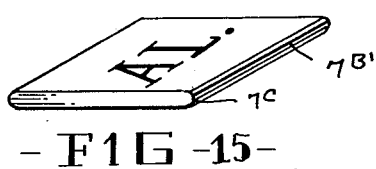
Inventor
ABRAHAM LUBALL., Patented Oct. 8, 1935

2,016,644

UNITED STATES PATENT OFFICE 2,016,644

IDENTIFICATION DEVICE FOR TOOTH-BRUSHES

Abraham Luball, Ventnor, N. J.

Application May 22, 1934, Serial No. 726,992

4 Claims. (Cl. 40—2)

My present invention, in its broad aspect, has to do with improvements in means for personally or individually identifying the owner or user of tooth brushes and the like; although it is pointed out that my present identification means may be used with other objects than tooth brushes, as for instance, umbrellas, canes and the like. Heretofore it has been common practice to give tooth brushes different colors as a means for identifying their users, but this means of identification requires the exercise of memory to bring to mind the color of the toothbrush used by the person making the selection; and forgetfulness of the color occasions use of the wrong brush with possibility of contracting some disease of the gums or the like. My means of identification, on the other hand is by the initials or distinguishing symbol of the owner or user and the identification is positive and certain.

Furthermore, my identification device contemplates the use of a number of spring clips; each bearing a letter of the alphabet, or symbol, or the like; so that by chosing and arranging the clips on the handle of a brush the owners' or users' initials may be made up; or other positive identifying symbol, to the end that the proper toothbrush, or the like, will always be selected without possibility of mistake.

In addition to the foregoing, I have provided means in the form of the toothbrush handle whereby the identification devices may be quickly and readily applied when the toothbrush is sold, and when so applied will lie flush with the surface of the handle; thus preserving the smoothness and continuity of the surface and eliminating anything that might catch dirt or extraneous matter, or interfere with manipulation of the brush. Furthermore; in selecting the identification means for application to a toothbrush handle; suitable color schemes may be carried out in addition to the positive identification of letters, initials or symbols.

My identification means is so constructed and formed that the cost of the brush is not appreciably increased; and neither is the conventional form, shape, size or color of the ordinary toothbrush changed; there being simply the provision of a groove, recess or the like; to receive one or more spring clips carrying the identification of the owner or user.

Emphasis is laid upon the fact that my inventive concept covers any positive form of identification by means of the alphabet in any form to be applied in any manner or shape; that is, any individual, personal identification of an owner or user of a toothbrush by initials, symbols and the like. To that end I have shown and described several modified forms of my invention as well as the original embodiment; for instance the use of a dovetailed plate, and the use of a plate sliding into an opening through the handle so that the letters show through the transparent material of the handle.

In the drawings, wherein I have shown a form of my invention, and several embodiments of modified constructions:—

Figure 1 is a side view of a toothbrush with my identification device applied thereto;

Figure 2 is a top plan view of the same;

Figure 3 is a view of the side carrying the bristles;

Figure 4 is an enlarged detail of the handle with the identification clips applied;

Figure 5 is an enlarged detail of the handle with the identification clips removed;

Figure 6A is a view taken on the line A—A of Figure 4;

Figure 6B is a view taken on the line B—B of Figure 5;

Figure 7 is a perspective enlarged view of a clip;

Figure 8 is a perspective enlarged view of a clip applied to a handle;

Figure 9 is a view of initials of an owner simply stamped, glued or otherwise placed on the handle of a brush;

Figure 10 is a perspective view of a toothbrush having a modified form of identification plate fitting into a dovetailed slot;

Figure 11 is an enlarged detail with the plate removed;

Figure 12 is a perspective view of the plate;

Figure 13 is a perspective view of a toothbrush handle with a plate carrying initials fitted into an opening extending through the handle;

Figure 14 is a section through the handle with the plate in position;

Figure 14A is a section with the plate removed;

Figure 14B is a section with the plate partially inserted;

Figure 15 is a perspective view of the plate used with an opening extending through the material of a transparent toothbrush handle.

In the drawings like characters of reference are used to designate like or similar parts throughout the several views:—

It is to be understood that the embodiments of my invention herein described are designed to give practical application to a positive form of identification by means of the alphabet. So it is pointed out that circumstances may indicate widely different specific forms. For instance in the principal form, a clip is used and application of the initials of a user facilicated by maintaining a box of clips carrying various letters of the alphabet in the store where the brushes are sold. In the form shown in Figures 10 to 12; a plate is used having beveled side edges fitting into a surface dovetailed slot in the handle. In the form shown in Figures 13 to 15 a plate carrying the initials is inserted in an opening extending from side to side through the body of a conventional form of toothbrush having a transparent or semi-transparent handle, made for instance of some cellulose substance, as for instance "Pyralin". Several of the preferred forms have been shown so that various applications of the inventive idea may be understood and applied by one skilled in the art to which this invention belongs.

The numeral (1) designates a conventional toothbrush having the usual bristled head (2) and handle (3); the handle has the usual opening (4) for hanging the brush on a hook or the like.

Midway the ends of the handle is formed a groove or recess (5) which extends across the face and around the side edges; the remaining face (5a) being ungrooved. The edge parts of the grooved part are beveled as at (6) to receive thereover the fingers or engaging parts (7a) of spring clips (7); each of which carries a letter or the like (8).

In practice one or more clips are selected to make up the initials of the owner or user of the tooth brush, as for instance "A—L" and these are pressed into the groove or recess (5) until the fingers (7a) clip over the beveled part (6) to hold the clips in place with the clips filling the groove or recess and lying flush with the surface of the handle of the brush, thereby to preserve the continuity of the surface and accordingly prevent accumulation of soap and dirt and present a smooth surface to the hand when gripping the handle. In Figure 9 there is shown a part of a toothbrush handle which is simply stamped by a suitable machine with the owners initials at a store when the brush is purchased or displaying the initials of the owner carried on small labels glued or pasted on the handle.

In Figures 10 to 12, I have shown a form wherein the handle (3a) is formed with a dovetailed groove (5a') therein to receive a plate (7a') having beveled edges (7b) and the initials (8a); said plate fitting into the groove as shown in Figure 10. In Figures 13 to 15, I have shown the handle (3b) provided with an opening (5b) through the body thereof to receive a plate (7b') which carries the initials which in this form show through the transparent or semi-transparent surface of the handle. In either of these forms the continuity of the surface of the brush is preserved and indentification is certain and positive.

Since further changes may be made in size, shape and arrangement of parts, the scope of my invention should only be determined from the claims appended hereto.

I claim:—

1. A toothbrush having a head and a handle; the handle having a reduced portion on one side and the edges thereof; and one or more detachable clips fitting into the reduced portion and bearing the initials or other designation of the owner or user of the brush.

2. A toothbrush having a head and a handle; the handle having a groove extending across one face thereof and about the edges and beveled; a spring clip detachably fitting thereon and bearing the identifying symbol or initial of the owner or user of the brush.

3. A toothbrush having a head and a handle; the handle having a beveled groove therein extending across one face and around the edges; spring clips detachably engaging in the groove and carrying identification symbols of the owner or user of the brush.

4. A toothbrush having a head and a handle; the handle having a reduced portion on one side and the edges thereof, the reduced portion being beveled to eliminate sharp edges, and one or more substantially U-shaped spring clips detachably fitting thereon and being the identifying symbol or initial of the owner or user of the brush.

ABRAHAM LUBALL.